(12) United States Patent
Horn et al.

(10) Patent No.: US 6,273,653 B1
(45) Date of Patent: Aug. 14, 2001

(54) MACHINE TOOL FOR CUTTING PROCESSES WITH A HORIZONTALLY LODGED WORK SPINDLE

(75) Inventors: Wolfgang Horn, Pleidelsheim; Dietrich Geiger, Grossbottwar, both of (DE)

(73) Assignee: Hüller Hille GmbH (DE)

( * ) Notice: Subject to any disclaimer, the term of this patent is extended or adjusted under 35 U.S.C. 154(b) by 0 days.

(21) Appl. No.: 09/269,611

(22) PCT Filed: Sep. 24, 1997

(86) PCT No.: PCT/EP97/05237

§ 371 Date: Jan. 6, 1999

§ 102(e) Date: Jan. 6, 1999

(87) PCT Pub. No.: WO98/13170

PCT Pub. Date: Apr. 2, 1998

(30) Foreign Application Priority Data

Sep. 26, 1996 (DE) .............................................. 196 39 527

(51) Int. Cl.⁷ ....................................................... B23D 7/00

(52) U.S. Cl. ............................ 409/235; 409/191; 408/234; 29/281.1

(58) Field of Search ..................................... 409/235, 185, 409/190–191; 408/234; 29/280.1

(56) References Cited

U.S. PATENT DOCUMENTS

| | | | | |
|---|---|---|---|---|
| 2,007,314 | * | 7/1935 | Stuhlmacher | 409/235 |
| 3,825,363 | * | 7/1974 | Lanman | 409/234 |
| 4,632,615 | * | 12/1986 | Yamamura | 409/235 |
| 4,987,668 | | 1/1991 | Roesch . | |
| 5,938,577 | * | 8/1999 | Lindem | 409/234 |
| 5,988,959 | * | 11/1999 | Sugata | 409/235 |

FOREIGN PATENT DOCUMENTS

| | | |
|---|---|---|
| 1910 693 | 10/1969 | (DE) . |
| 33 33 480 A1 | 4/1985 | (DE) . |
| 0 232 548 | 8/1987 | (EP) . |
| 38 32 975 C1 | 8/1987 | (DE) . |

* cited by examiner

*Primary Examiner*—Joseph J. Hail, III
*Assistant Examiner*—Lee Wilson
(74) *Attorney, Agent, or Firm*—McGlew and Tuttle, P.C.

(57) ABSTRACT

A machine tool for the cutting process of work pieces and having at least one horizontally lodged work spindle, preferably for high speed and/or high precision processing. The work spindle displaces on and/or inside a frame-like tool carrier vertically placed on a machine support having slides moving along x-, y- and z-axes. According to the invention, the frame-like tool carrier (3) has an associated frame-like work piece holder (2), which is also placed vertically on the machine support (1). The work piece holder (2) and the tool carrier (3) are interconnected as one single stable unit by one or several connecting elements (8) in the area of their upper horizontal traverse (4, 6).

15 Claims, 5 Drawing Sheets

MACHINE TOOL FOR CUTTING PROCESSES WITH A HORIZONTALLY LODGED WORK SPINDLE

FIELD OF THE INVENTION

The invention relates to a machine tool for the cutting process of work pieces, having at least one horizontally lodged work spindle, preferably for high speed and/or high precision processing, with the work spindle being able to be moved on and/or inside a frame-like tool carrier vertically placed on a machine support having slides moving along x-, y-, and z-axes.

BACKGROUND OF INVENTION

Known from U.S. Pat. No. 4,987,668 is a generic machine tool wherein the tool carrier is vertically placed on a machine support and wherein the horizontally lodged spindle can be moved in the x and y-direction. The work piece holder is also placed on the machine support and can be displaced in z-direction and be turned around a vertical axis, too. Mobility of the work spindle in z-direction is not feasible and/or not provided for therein.

EP-0 232 548 A2 describes a processing station, particularly for comparably large work pieces, equipped with a processing unit preferably having a laser, wherein the processing unit is also lodged at a frame-like vertical support post and can be moved in x-, y-, and z-direction, On certain applications, e.g. on high-speed and/or high-precision processing, it became evident that high acceleration and processing forces act on the tool carrier when the processing unit is moved in z-direction. On processing it might lead to inaccuracies, and it calls for a very stable and expensive design and construction of the tool carrier, particularly if the work space is very large and if the feed forward speed and/or acceleration rate are very fast. Moreover, substantial displacement between tool side and work piece side has frequently become evident in processing centers known thus far, due to involvement of coolants, different coolant temperatures, and changes in hall temperature.

Known from DE 38 32 975 C1 is a multiple-spindle autolathe with a frame-like casing consisting of a bottom machine bed, a spindle post with a controllable spindle drum, a drive post for the drives of the processing tools and a top traverse between spindle post and drive post. The work space is interspersed by a central pipe on which a longitudinal slide block is placed and which rests supported in the spindle drum on the one hand and in the drive post on the other hand.

Mobility of the spindle by the aid of x-, y-, and z-slides is not provided for hereunder. Moreover only relatively small work pieces can be processed.

SUMMARY AND OBJECTS OF THE INVENTION

Therefore it is the primary task of the present invention to propose a generic machine tool which does not pose these problems and which allows for an exact positioning of the processing unit in relation to the work piece.

The solution to this task is attained by a frame type tool carrier and a frame type workpiece holder mounted on a support. A connection bar or means connects the workpiece holder to the tool carrier to form a single stable unit.

According to the invention a vertical, frame-like tool carrier is mounted on the support. In parallel with the tool carrier and on opposite site of the support is placed a vertical frame-like work piece holder or carrier. Upper basically equally high horizontal traverses of these carriers are connected through one or several preferably horizontal connecting bars and/or means to form a stable unit. Thus a frame-like structure is created in a z-direction, which prevents relative movement between the work piece holder and the tool carrier even if high acceleration and processing forces are applied. At the same time it makes a precise positioning between tool and work piece feasible. The work piece holder may also be shaped like a frame in the x- and y-directions, similar to the tool carrier, so that the work piece is positioned inside the frame in an easy and simple manner. The work piece can be moved through the frame in z-direction and, if required, be transported into or out of the machine tool in the x- or y-direction.

The connecting bar or means between the tool carrier and the work piece holder may be placed particularly off center, such as at one of the longitudinal sides or at both, so that the space directly over the point of processing remains free, for example to load and unload the work piece. A unilateral eccentric arrangement of a connecting means may bear the advantage that better access to the processing space or room is then possible or allowed from the opposite side.

The connecting bar or means may also be shaped like a fork, with two legs of the fork attacking at the upper end of the vertical side posts of the tool carrier or work piece holder and with the opposite leg being connected with an upper traverse of the work piece holder an or tool carrier. Layouts adapted to the size and shape of work pieces, tool changing equipment and to other requirements are also possible and included.

For example, to be able to process work pieces in z-direction simultaneously from both sides, it is also feasible under this invention to place tool carriers at both sides of a work piece holder, where the tool carriers are connected via connecting means to the work piece holder.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
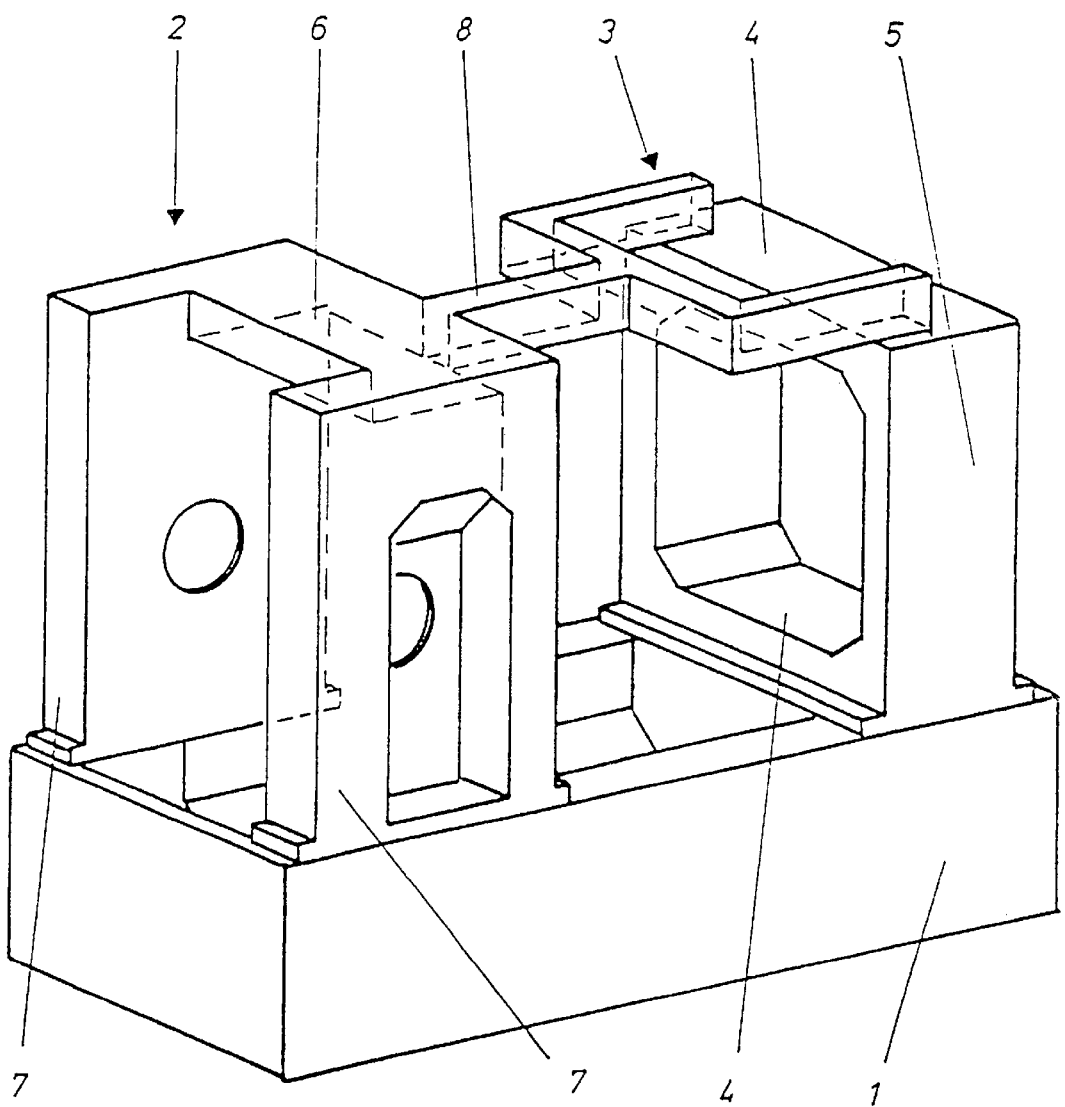
FIG. 1 is a view of a connecting means between the work piece holder and the tool carrier, and lodged on a machine support post.

Referring to the drawings, and in particular to FIG. 1, a machine support post 1 includes a tool carrier 3 consisting of vertical side cheeks 5 and horizontal traverses 4. In parallel with the tool carrier 3, on the opposite side of the support post 1, a work piece holder 2 formed by vertical supports 7 and upper traverses 6 is provided. The horizontal traverse 4 and the upper traverse 6 are interconnected via a connection bar or means 8.

Figure 2:
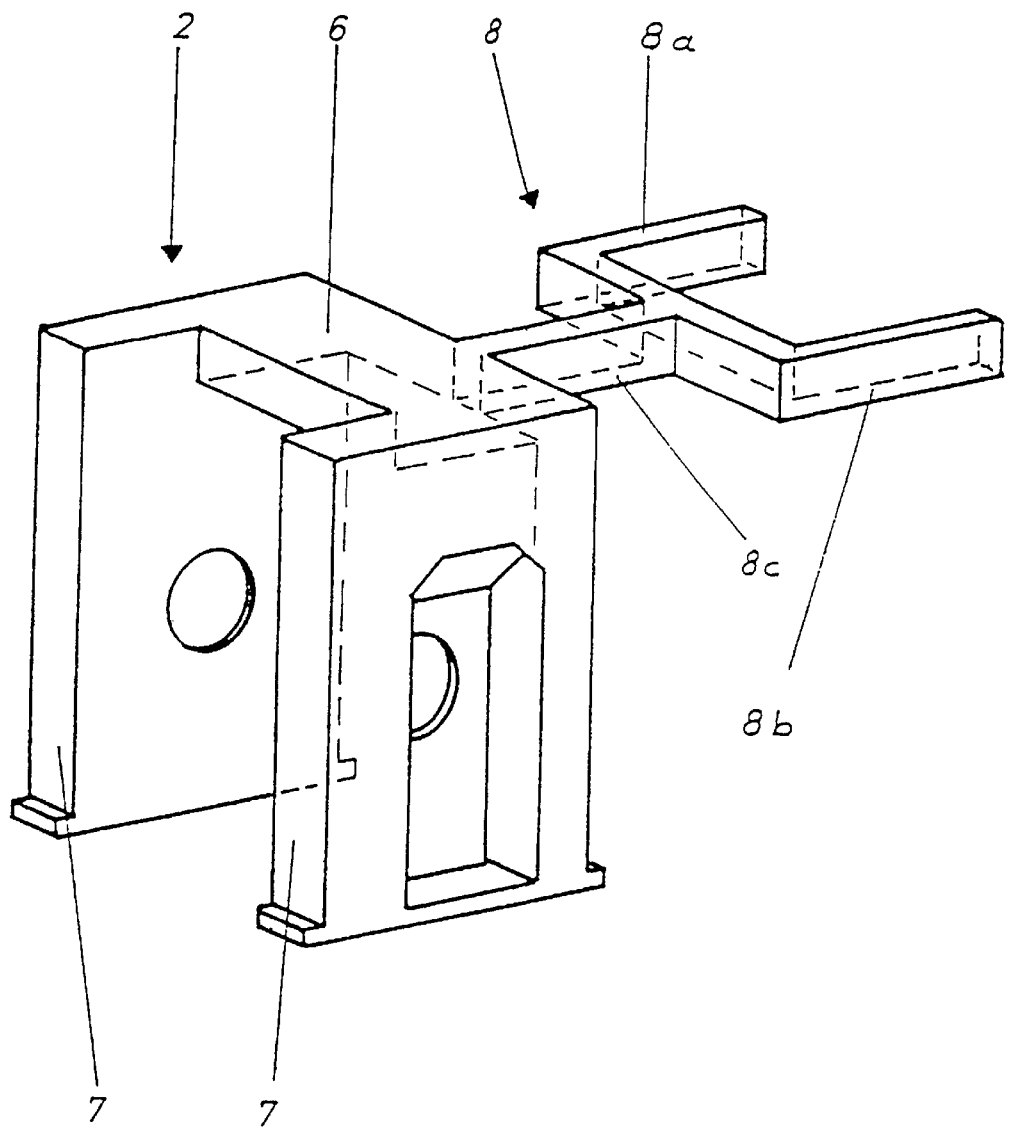
FIG. 2 is a detail view of the work piece holder with a fork-like connecting means affixed to the work piece holder.
Figure 3:
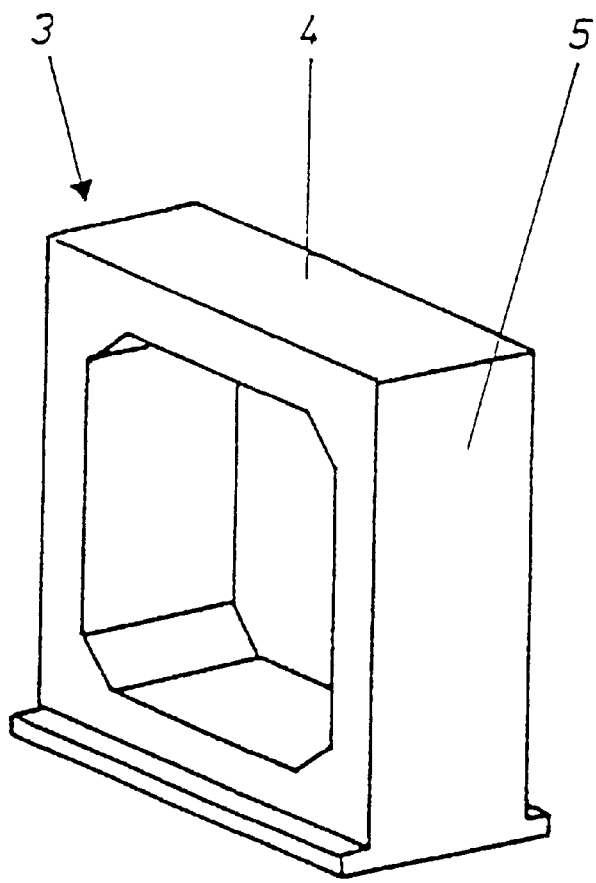
FIG. 3 is a detail view of the tool carrier.
Figure 3:
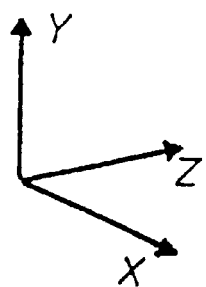

Pursuant to FIG. 2 the connection means is of a fork-like shape and affixed with one leg 8c at the upper traverse 6. Ends of the two legs 8a and 8b are connectable with the horizontal traverse 4. In conformity with ambient circumstances and strength requirements, leg 8c may be affixed centrally or eccentrically or at one end of traverse 6.

Figure 4:
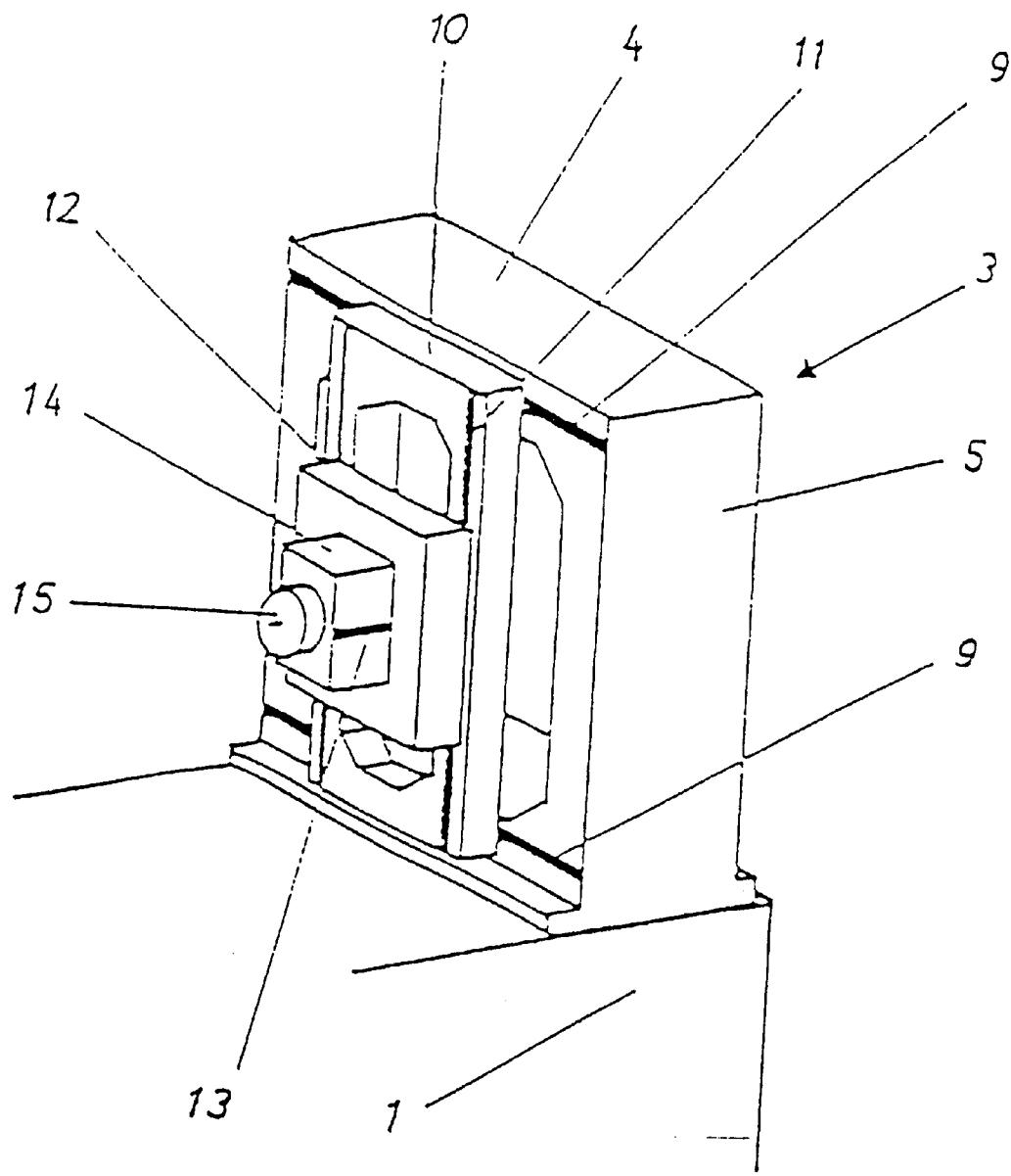
FIG. 4 is a view of the equipment allowing for mobility of work the spindle at the tool carrier.

FIG. 4 shows how the work spindle 15 can be moved in a plurality of substantially orthogonal directions inside the frame-like tool carrier 3. To this effect, a frame-like X-slide 10 is at first movable in X-direction in horizontal guides 9, as indicated by the axes in the figures. Additionally a Y-slide 12 which is also shaped like a frame can be moved at vertical guides 11 in the Y-direction. Moreover the sleeve-like Z-slide 14 with its integrated motor work spindle 15 can be moved in Z-direction in horizontal guides 13. Tool carrier 3, X-slide 10 and Y-slide 12 may be of a hollow construction and be provided with a closed-circuit cooling.

Figure 5:
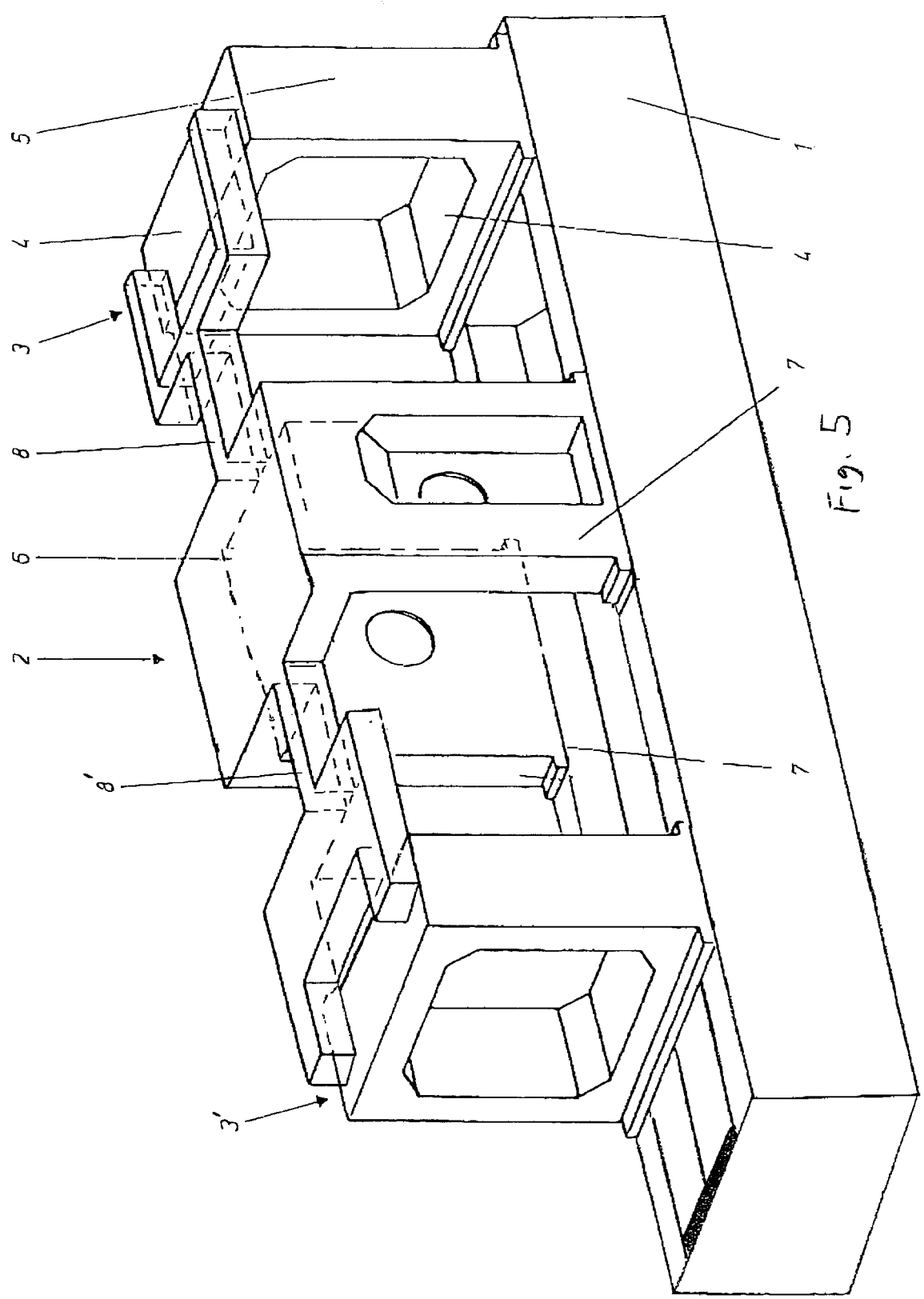
FIG. 5 is a view of two connecting means between two work piece holders and the tool carrier, and lodged on a machine support post.

FIG. 5 shows an embodiment with another tool carrier 3' mounted on the support 1 on a side of the work piece holder 2 opposite the tool carrier 3. Another connection 8' connects the workpiece holder 2 to the another tool carrier 3' to form said single stable unit.

While specific embodiments of the invention have been shown and described in detail to illustrate the application of the principles of the invention, it will be understood that the invention may be embodied otherwise without departing from such principles.

What is claimed is:

1. A tool for cutting of a workpiece, the tool comprising:
   a support;
   a tool carrier mounted on said support;
   a work spindle connected to said tool carrier;
   a plurality of slides movably connecting said work spindle to said tool carrier in a plurality of substantially orthogonal directions;
   a workpiece holder mounted on said support;
   a connection rigidly connecting said workpiece holder to said tool carrier to fix said tool carrier and said workpiece holder together in a single stable unit.

2. A tool in accordance with claim 1, wherein:
   said tool carrier and said workpiece holder each have a traverse element which is substantially parallel to said support, said traverse elements are positioned on a side of respective said tool carrier and said workpiece opposite to said support;
   said connection connects said traverse elements of said tool carrier and said workpiece holder.

3. A tool in accordance with claim 1, wherein:
   said tool carrier and said workpiece holder each have an upper horizontal traverse element;
   said connection connects said traverse elements of said tool carrier and said workpiece holder.

4. A tool in accordance with claim 1, wherein:
   said connection is placed eccentrically with respect to one of said tool carrier and said workpiece holder.

5. A tool in accordance with claim 1, wherein:
   said connection is placed in an area of a longitudinal side of said support.

6. A tool in accordance with claim 1, wherein:
   said tool carrier includes side cheeks;
   said workpiece holder includes a traverse element;
   said connection is a shaped structure with two legs connected to said side cheeks of said tool carrier, and said shaped structure includes another leg connected with said traverse element of said work piece holder.

7. A tool in accordance with claim 6, wherein:
   said side cheeks of said tool carrier are substantially vertical and said two legs are connected to an upper end of said vertical side cheeks of said tool carrier;
   said traverse element of said workpiece holder is at an upper end of said workpiece holder.

8. A tool in accordance with claim 1, wherein:
   another tool carrier is mounted on said support on a side of said work piece holder opposite said tool carrier;
   another connection connects said workpiece holder to said another tool carrier to form said single stable unit.

9. A tool in accordance with claim 1, wherein:
   said plurality of orthogonal directions includes three orthogonal directions;
   said connection is in a form of a bar.

10. A tool in accordance with claim 1, wherein:
    said tool carrier and said workpiece holder each have a traverse element which is substantially parallel to said support, said traverse elements are positioned on a side of respective said tool carrier and said workpiece opposite to said support;
    said connection connects said traverse elements of said tool carrier and said workpiece holder, said connection is placed eccentrically with respect to one of said tool carrier and said workpiece holder, said connection is placed in an area of a longitudinal side of said support, said connection is a shaped structure with two legs connected to said tool carrier, and said shaped structure includes another leg connected with said traverse element of said work piece holder;
    another tool carrier is mounted on said support on a side of said work piece holder opposite said tool carrier;
    another connection connects said workpiece holder to said another tool carrier to form said single stable unit;
    said plurality of orthogonal directions includes three orthogonal directions;
    said connection is in a form of a bar.

11. A tool in accordance with claim 1, wherein.
    said tool carrier and said workpiece holder are rectangular shaped.

12. A tool in accordance with claim 1, wherein:
    said connection is rigidly connected to said tool carrier and to said workpiece bolder.

13. A tool in accordance with claim 1, wherein:
    said support has two longitudinal sides and said connection is placed in an area of both said longitudinal sides of said support.

14. A tool for cutting of a workpiece, the tool comprising:
    a support;
    a tool carrier mounted on said support;
    a work spindle connected to said tool carrier;
    a plurality of slides movably connecting said work spindle to said tool carrier in a plurality of substantially orthogonal directions;
    a workpiece holder mounted on said support, said tool carrier and said workpiece holder each having a traverse element which is substantially parallel to said support, said traverse elements are positioned on a side of respective said tool carrier and said workpiece opposite to said support;

a connection connecting said workpiece holder to said tool carrier to form a single stable unit, said connection connects said traverse elements of said tool carrier and said workpiece holder.

15. A tool for cutting of a workpiece, the tool comprising:

a support;

a tool carrier mounted on said support;

a work spindle connected to said tool carrier;

a plurality of slides movably connecting said work spindle to said tool carrier in a plurality of substantially orthogonal directions, said plurality of orthogonal directions includes three orthogonal directions;

a workpiece holder mounted on said support, said tool carrier and said workpiece holder each having a traverse element which is substantially parallel to said support, said traverse elements are positioned on a side of respective said tool carrier and said workpiece opposite to said support;

a connection connecting said workpiece holder to said tool carrier to form a single stable unit, said connection is in a form of a bar.

\* \* \* \* \*